(12) United States Patent
Shchukin et al.

(10) Patent No.: US 9,340,676 B2
(45) Date of Patent: May 17, 2016

(54) CORROSION INHIBITING PIGMENT COMPRISING NANORESERVOIRS OF CORROSION INHIBITOR

(75) Inventors: Dmitry Shchukin, Berlin (DE); Helmuth Möhwald, Bingen (DE); Mário Guerreiro Silva Ferreira, Lisbon (PT); Mikhail Zheludkevich, Aveiro (PT)

(73) Assignee: Max-Planck-Gesellschaft zur Förderung der Wissenschaften e.V. (DE)

( * ) Notice: Subject to any disclaimer, the term of this patent is extended or adjusted under 35 U.S.C. 154(b) by 1628 days.

(21) Appl. No.: 12/282,185

(22) PCT Filed: Mar. 7, 2007

(86) PCT No.: PCT/EP2007/001971
§ 371 (c)(1),
(2), (4) Date: Oct. 1, 2008

(87) PCT Pub. No.: WO2007/104457
PCT Pub. Date: Sep. 20, 2007

(65) Prior Publication Data
US 2009/0078153 A1   Mar. 26, 2009

(30) Foreign Application Priority Data
Mar. 10, 2006   (EP) .................................. 06004993

(51) Int. Cl.
*C04B 9/02* (2006.01)
*C04B 14/02* (2006.01)
(Continued)

(52) U.S. Cl.
CPC ............... *C09C 1/3676* (2013.01); *B82Y 30/00* (2013.01); *C04B 20/1029* (2013.01);
(Continued)

(58) Field of Classification Search
CPC . B82Y 30/00; C01P 2004/13; C01P 2004/34; C01P 2004/62; C01P 2004/64; C08K 3/22; C08K 7/24; C08K 9/08; C09C 1/3072; C09C 1/3676; C09C 3/10; C09D 5/082; C09D 7/12; C09D 7/1266; C09D 7/1275
USPC .................................... 106/447, 14.05, 14.41
See application file for complete search history.

(56) References Cited

U.S. PATENT DOCUMENTS 3,935,125 A * 1/1976 Jacob .............................. 422/15
5,288,315 A * 2/1994 Braig et al. ................ 106/14.15
(Continued)

FOREIGN PATENT DOCUMENTS

| DE | 10064638 | 7/2002 |
| JP | 62-079277 | 4/1987 |

(Continued)

OTHER PUBLICATIONS

Mikhail L. Zheludkevich et al., "Oxide Nanoparticle Reservoirs for Storage and Prolonged Release of the Corrosion Inhibitors", *Electrochemistry Communications*, 2005, vol. 7 No. 8, pp. 836-840.
(Continued)

*Primary Examiner* — Shuangyi Abu Ali
(74) *Attorney, Agent, or Firm* — DLA Piper LLP (US)

(57) ABSTRACT

A corrosion inhibiting pigment includes nanoscale reservoirs (nanoreservoirs) of corrosion inhibitor for active corrosion protection of metallic products and structures, wherein the nanoreservoirs include a polymer or polyelectrolyte shell which is sensitive to a specific trigger and capable of releasing the inhibitor after action of the trigger. An anti-corrosive coating with self-healing properties includes the pigment, methods for preparing the pigment, in particular by layer-by-layer deposition, as well as methods of use of the pigment.

12 Claims, 6 Drawing Sheets

(51) Int. Cl.

| | | |
|---|---|---|
| C08K 9/10 | (2006.01) | |
| C09D 5/08 | (2006.01) | |
| B05D 5/00 | (2006.01) | |
| C04B 14/04 | (2006.01) | |
| C04B 14/36 | (2006.01) | |
| C09C 1/36 | (2006.01) | |
| B82Y 30/00 | (2011.01) | |
| C09C 1/30 | (2006.01) | |
| C09C 3/10 | (2006.01) | |
| C09D 7/12 | (2006.01) | |
| C04B 20/10 | (2006.01) | |
| C08K 3/22 | (2006.01) | |
| C08K 7/24 | (2006.01) | |
| C08K 9/08 | (2006.01) | |
| C04B 111/26 | (2006.01) | |

(52) U.S. Cl.
CPC .............. *C09C 1/3072* (2013.01); *C09C 3/10* (2013.01); *C09D 5/082* (2013.01); *C09D 7/12* (2013.01); *C09D 7/1266* (2013.01); *C09D 7/1275* (2013.01); *C01P 2004/13* (2013.01); *C01P 2004/34* (2013.01); *C01P 2004/62* (2013.01); *C01P 2004/64* (2013.01); *C04B 2111/26* (2013.01); *C08K 3/22* (2013.01); *C08K 7/24* (2013.01); *C08K 9/08* (2013.01)

(56) References Cited

U.S. PATENT DOCUMENTS

| | | | | |
|---|---|---|---|---|
| 6,383,271 | B1 * | 5/2002 | Schmidt | 106/14.41 |
| 6,780,920 | B2 * | 8/2004 | Chapman et al. | 524/493 |
| 6,933,046 | B1 * | 8/2005 | Cook | 428/402 |
| 2002/0149656 | A1 * | 10/2002 | Nohr et al. | 347/95 |

FOREIGN PATENT DOCUMENTS

| | | |
|---|---|---|
| JP | 1-176096 A | 7/1989 |
| JP | 2-83101 U | 6/1990 |
| JP | 04-183756 | 6/1992 |
| JP | 2000-281977 A | 10/2000 |
| JP | 2004-353025 | 12/2004 |

OTHER PUBLICATIONS

A. N. Khramov et al.; "Hybrid Organo-Ceramic Corrosion Protection Coatings With Encapsulated Organic Corrosion Inhibitors", *Thin Solid Films* 2004, vol. 447-448, pp. 549-557.

C. M. Dry et al., "A Time-Release Technique for Corrosion Prevention", *Cement and Concrete Research*, 1998, vol. 28, No. 8, pp. 1133-1140.

Martin Kendig et al. "Smart Corrosion Inhibiting Coatings", *Progress in Organic Coatings*, 2003, vol. 47, pp. 183-189.

H. Tatematsu et al., "Repair Materials System for Chloride-Induced Corrosion of Reinforcing Bars", *Cement & Concrete Composites*, 2003, vol. 25, pp. 121-129.

G. Decher et al. "Buildup of Ultrathin Multilayer Films by Self-Assembly Process: III. Consecutively Alternating Adsorption of Anionic and Cationic Polyelectrolytes on Charged Surfaces", *Thin Solid Films*, 1992, vol. 210/211, pp. 831-835.

Gero Decher, "Fuzzy Nanoassemblies. Toward Layered Polymeric Multicomposites", *Science*, 1997, vol. 277, pp. 1232-1237.

Georgious Sakellariou et al. "Homopolymer and Block Copolymer Brushes on Gold by Living Anionic Surface-Initiated Polymerization in a Polar Solvent", *Journal of Polymer Science*, 2006, vol. 44, pp. 769-782.

Arumugham Balakumar et al., "Diverse Redox-Active Molecules Bearing O-, S-, or Se-Terminated Tethers for Attachment to Silicon in Studies of Molecular Information Storage", *American Chemical Society*, 2004. vol. 69, pp. 1435-1443.

Jeffrey L. Turner et al. "PNA-Directed Solution- and Surface-Assembly of Shell Crosslinked (SCK) Nanoparticle Conjugates", *Soft Matter*, 2005, vol. I, pp. 69-78.

H. Schmidt et al., "A New Corrosion Protection Coating System for Pressure-Cast Aluminum Automotive Parts", *Materials & Design*, 1997 vol. 18, pp. 309-313.

M. L. Zheludkevich et al. "Nanostructured Sol-Gel Coatings Doped With Cerium Nitrate as Pre-Treatments for AA2024-T3 Corrosion Protection Performance", *Electrochimica Acta*, 2005, vol. 51, pp. 208-217.

\* cited by examiner

CORROSION INHIBITING PIGMENT COMPRISING NANORESERVOIRS OF CORROSION INHIBITOR

RELATED APPLICATIONS

This is a §371 of International Application No. PCT/EP2007/001971, with an international filing date of Mar. 7, 2007 (WO 2007/104457 A1, published Sep. 20, 2007), which is based on European Patent Application No. 06004993.9, filed Mar. 10, 2006.

TECHNICAL FIELD

This disclosure relates to corrosion inhibiting pigments, anti-corrosive coatings and methods of making the pigments.

BACKGROUND

Corrosion of metals is one of the main destruction processes of metallic structures leading to huge economic losses. Commonly, polymer coating systems are applied on the metal surface which provide a dense barrier for the corrosive species to protect metal structures from the corrosion attack. When the barrier is damaged and the corrosive agents penetrate to the metal surface the coating system is not able to stop the corrosion process. The most effective solution so far developed for anticorrosion coatings for active protection of metals is to employ chromate-containing conversion coatings. However, the hexavalent chromium species can be responsible for several diseases including DNA damage and cancer, which is the main reason for banning $Cr^{6+}$-containing anticorrosion coatings in Europe from 2007.

The deposition of thin inorganic or hybrid films on metallic surface was suggested as a pre-treatment to provide an additional barrier for corrosion species and mainly to improve adhesion between metal at polymer coating system. The films are usually deposited by the plasma polymerization technique or the sol-gel route. Sol-gel derived thin films containing either inorganic (phosphates, vanadates, borates, cerium and molybdenum compounds) or organic (phenylphosphonic acid, mercaptobenzothiazole, mercaptobenzoimidazole, triazole) inhibitors were investigated to substitute chromates. Among them, the highest activity was shown for sol-gel coatings with cerium dopant of critical concentration in the 0.2-0.6 wt. % range. However, negative effects of the free inhibitor occluded in the sol-gel matrix on the stability of the protective film were observed for all types of inhibitors (for instance, higher concentration of Ce leads to the formation of microholes in the sol-gel film). In view of this shortcomings the use of reservoirs providing the corrosion inhibitor in isolated form inside the reservoir and preventing its direct interaction with sol-gel matrix was contemplated. Such reservoirs should be homogeneously distributed in the film matrix and should possess controlled and corrosion-stimulated inhibitor release to cure corrosion defects.

Mixed oxide nanoparticles (e.g., $ZrO_2$—$CeO_2$; M. L. Zheludkevich, R. Serra, M. F. Montemor, M. G. S. Ferreira, *Electrochem. Commun.* 2005, 8, 836), β-cyclodextrin-inhibitor complexes, (A. N. Khramov, N. N. Voevodin, V. N. Balbyshev, M. S. Donley, *Thin Solid Films* 2004, 447, 549), hollow polypropylene fibers (C. M. Dry, M. J. T. Corsaw, *Cement and Concrete Research* 1998, 28, 1133), conducting polyaniline (M. Kendig, M. Hon, L. Warren, *Prog. Org. Coat.* 2003, 47, 183) were explored as perspective reservoirs for corrosion inhibitors to be incorporated in the protective film. The common mechanism of such reservoir-based approaches is the slow release of inhibitor triggered by corrosion processes. Ion-exchangers were also investigated as "smart" reservoirs for corrosion inhibitors. Chemically synthesized hydrocalmite behaves as an anion exchanger to adsorb corrosive chloride ions releasing nitrite inhibiting anions (H. Tatematsu, T. Sasaki, *Cement & Concrete Composites* 2003, 25, 123).

Despite considerable efforts devoted to the development of new complex anticorrosion systems, practically no single solution is able to fulfill the requirements for sufficient corrosion protection avoiding chromates in the coating, especially in case of aluminium alloys used for aerospace applications. Approaches for combining inhibitor species and coating matrix, which were developed so far, have two considerable shortcomings: relatively short time of substrate protection, blistering and delamination of the coating thus degrading its physical and mechanical properties, destruction of barrier layer (often seen with molybdates and borates).

It would therefore be helpful to provide new, effective and broadly applicable means for providing active corrosion protection, in particular with self-healing ability.

SUMMARY

Our pigments, coatings and methods are based on the surprising finding that in particular the recently developed technology of layer-by-layer (LbL) deposition (G. Decher, J. D. Hong, J. Schmitt, *Thin Solid Films* 1992, 210/211, 831, and G. Decher, *Science* 1997, 277, 1232) of oppositely charged species (polyelectrolytes, nanoparticles, enzymes, dendrimers) from their solutions on the substrate surface represents a very effective method for preparing corrosion inhibitor reservoirs with regulated storage/release properties assembled with nanometer thickness precision.

LbL coatings have found interest in photonics (optical filters, luminescent coatings), electrocatalysis (electrodes for DNA transfer, enzyme-catalyzed oxidation), as membranes and chemical reactors, but have never been used in the field of corrosion protection coatings.

Our studies revealed that the storage of corrosion inhibitors in nanoscale reservoirs ("nanoreservoirs"), i.e., reservoirs having average dimensions in the range of from 1 to 1000 nm, comprising a polymer or polyelectrolyte shell, for example composed of polyelectrolyte multilayers produced by the above referred technique of LbL deposition, offers a number of advantages. Such reservoirs are able to prevent any negative effects of the corrosion inhibitor on the stability of the coating; to decrease the influence of the coating polymerization on the inhibitor; to provide intelligent release of the corrosion inhibitor because the permeability of the nanoreservoirs, which, e.g., comprise polyelectrolyte assemblies, can be regulated by exposing them to an external stimulus or trigger such as a change of pH, ionic strength, humidity, light, temperature or by applying magnetic or electromagnetic fields. The change of pH is a preferred trigger for corrosion protection systems since, as well known, corrosion activity leads to local changes of pH in the cathodic and anodic areas. A 'smart' coating containing polyelectrolyte reservoirs may use the corrosion reaction to generate corrosion inhibitor.

The nanoreservoirs or nanocontainers for the corrosion inhibiting pigment are characterized by a polymer or polyelectrolyte shell which is sensitive to a specific trigger and capable to release the inhibitor after action of the trigger. The polymer (e.g., gelatin) or polyelectrolyte (e.g., poly(allyl amine)/poly(styrene sulfonate) shell may form nanoscale capsules in which the inhibitor (e.g., quinaldic acid, mercaptobenzotriazole) is enclosed or may form a coating on a nanoscale solid substrate, such as nanoparticles, e.g., metal, metal oxide nanoparticles, nanotubes, e.g., metal oxide or carbon nanotubes, halloysites (naturally occurring alumino-silicate nanotubes). In a specific embodiment, the solid substrate may be hollow or porous, e.g., hollow or porous nanoparticles, and the inhibitor may be incorporated in the cavity or pores thereof. In a preferred aspect, however, the inhibitor is incorporated into the polymer or polyelectrolyte shell itself. Thus, the solid substrate may be merely used as a support for the polymer or polyelectrolyte shell.

Therefore, the solid substrate may be any material which is capable to be coated by the polymer or polyelectrolyte shell and which is suitable for incorporation in commonly used coating compositions.

Specific, but not limiting examples for a suitable substrate are $SiO_2$, $ZrO_2$, $TiO_2$, $CeO_2$ nanoparticles.

In a specific aspect, the nanoreservoirs are to be used in sol-gel-based anti-corrosion systems (e.g., $SiO_2/ZrO_2$, $CeO_2/TiO_2$, $ZrO_2/In_2O_3$, $ZrO_2/Al_2O_3$ sol-gel systems). In this case, they have to be compatible with the material of the sol-gel matrix to prevent matrix distortion and to have a suitable nanoscale size to uniformly distribute loaded inhibiting species in the matrix. In particular, nanoscale structures built by the LbL approach are able to comply with these requirements in a very favorable manner.

The polymer or polyelectrolyte shell of the nanoreservoirs may comprise one or more layers of any suitable polymer or polyelectrolyte which is sensible to a trigger and capable to release the inhibitor compound(s) after action of the trigger. More specifically, the polymer or polyelectrolyte may be selected from the group consisting of poly(alkylene imine), e.g., poly(ethylene imine), poly(styrene sulfonate), poly(allyl amine), polyvinyl alcohol, poly(hydroxybutyric acid), polystyrene, poly(diallyldimethylammonium chloride), poly(meth)acrylic acid, polyalkylene glcol, e.g., polyethylene glycol, poly(vinylpyridine), and biopolymers and polyamino acids, such gelatine, agarose, cellulose, alginic acid, dextran, casein, polyarginine, polyglycin, polyglutamic acid, polyaspartic acid. Other suitable polymers will be evident for the skilled artisan and may be obtained by, e.g., modifying the above polymers/polyelectrolytes or other polymers/polyelectrolytes as appropriate by introducing specific groups according to methods well known in the art. These groups may confer specific desirable properties to the polymer/polyelectrolyte, such as a defined hydrophilicity, hydrophobicity, charge, strength, sensibility for a specific trigger etc. The polymer or polyelectrolyte may also comprise copolymers or blends of suitable polymers/polyelectrolytes, such as copolymers or blends of the above mentioned polymers or polyelectrolytes. In a specific aspect, the polyelectrolyte shell comprises alternate layers of a positively charged polyelectrolyte, e.g., poly(ethylene imine), and of a negatively charged polyelectrolyte, e.g., poly(styrene sulfonate).

The polymer or polyelectrolyte shell is preferably prepared by layer-by-layer assembly but may also be prepared by other suitable techniques of the prior art, such as surface polymerization (G. Sakellariou, M. Park, R. Advincula, J. W. Mays, N. Hadjichristidis, *J. Polym. Sci. A* 2006, 44, 769), surface deposition (A. Balakumar, A. B. Lysenko, C. Carcel, V. L. Malinovskii et. al. *J. Org. Chem.* 2004, 69, 1435), or self assembly techniques (J. L. Turner, M. L. Becker, X. X. Li, J. S. A. Taylor, K. L. Wooley *Soft Matter,* 2005, 1, 69).

The corrosion inhibitor to be stored in the nanoreservoirs of the corrosion inhibiting pigment may be any corrosion inhibitor known in the prior art which is suitable for the intended purpose. The choice of the inhibitor will depend, i.e., from the specific metallic products and structures to be protected, from the environmental conditions and operating conditions of the corrosion-protected products and other factors which will be evident for the skilled person in the art.

More specifically, the corrosion inhibitor may. e.g., comprise an organic compound selected from the group consisting of an organic compound containing one or more amino groups, an azole-derivative compound, an organic compound containing one or more carboxyl groups or salts of carboxylic acids, an organic compound containing one or more pyridinium or pyrazine groups, and a compound comprising one or more Schiff bases.

In one preferred embodiment, the corrosion inhibitor is benzotriazole or a derivative thereof.

Also, the inhibitor may comprise an inorganic compound which comprises one or more anions selected from the group comprising pyrophosphate ($P_2O_7^{2-}$), nitrite ($NO_2^-$), silicate ($SiO_4^{2-}$), molybdate ($MoO_4^{2-}$), borate ($BO_4^{3-}$), iodate ($IO_3^-$), permanganate ($MnO_4^-$), tungstate ($WO_4^{2-}$) and vanadate ($VO_3^-$).

The inhibitor may also comprise cations of one or metals selected from the group comprising lanthanides, magnesium, calcium, titanium, zirconium, yttrium, chromium and silver.

The inhibitor may also comprise two or more compounds selected from the above specified classes of inhibitors.

As already mentioned above, the specific trigger or stimulus which causes the polymer or polyelectrolyte shell to release the inhibitor enclosed or incorporated therein, may be any one of several stimuli to which the specific polymer or polyelectrolyte shell is known to be responsive. Typical triggers are a change of pH, ionic strength, temperature, humidity or water, light, mechanical stress, or magnetic or electromagnetic fields. A preferred trigger is a change of pH.

The corrosion inhibiting pigment may be added to pre-treatments (initial binding layers on a metal surface), primers, formulations of polymer coatings, powder coatings, paints and concretes, in particular in the form of a powder or a suspension.

Additional anti-corrosive applications of the pigments will be evident for the skilled person in the art.

DETAILED DESCRIPTION

Example 1

In a specific aspect the anti-corrosive and self-healing effects of layer-by-layer assembled nanoreservoirs embedded in hybrid epoxy-functionalized $ZrO_2/SiO_2$ sol-gel coatings deposited onto aluminum alloy AA2024 as a model metal substrate were investigated. 70 nm $SiO_2$ particles coated with poly(ethylene imine)/poly(styrene sulfonate) (PEI/PSS) layers were employed as nanoreservoirs. The corrosion inhibitor benzotriazole was entrapped within polyelectrolyte multilayers at the LbL assembly step; its release can be initiated by pH changes during corrosion of aluminium alloy.

Figure 1:
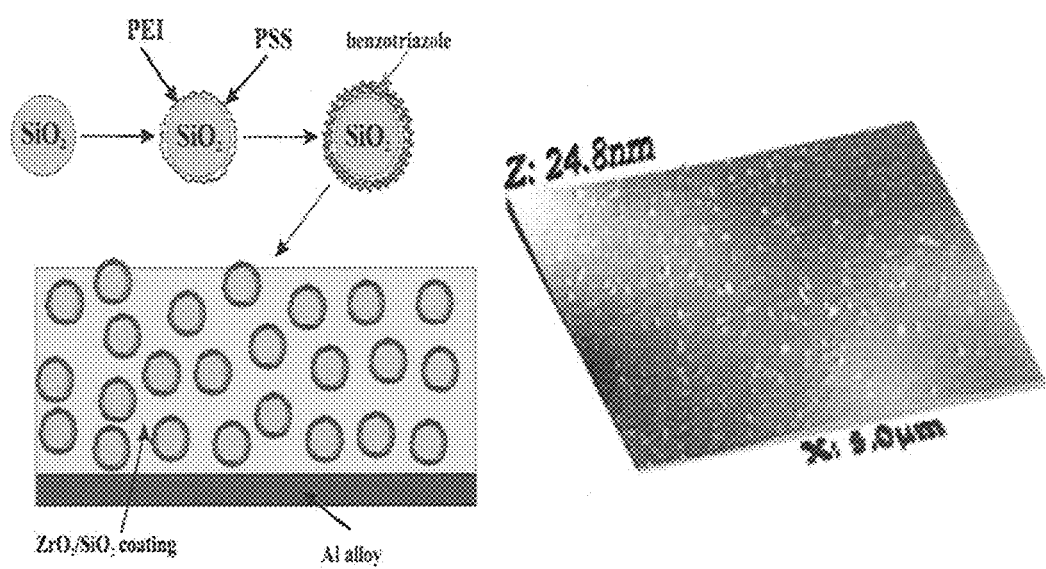
FIG. 1. Left—schematic representation of the fabrication of composite $ZrO_2/SiO_2$ coating loaded with benzotriazole nanoreservoirs. Right—AFM scanned topography of the resulting sol-gel coating containing nanoreservoirs.

$SiO_2$ nanoparticles were chosen as supporting hosts for the benzotriazole due to their ability to be incorporated inside hybrid silica-based sol-gel matrix preserving its structure. To produce inhibitor-loaded polyelectrolyte shell, the layer-by-layer deposition procedure for both large polyelectrolyte molecules and small benzotriazole ones was followed. Initial $SiO_2$ nanoparticles are negatively charged, so the adsorption of positive PEI (FIG. 1) was performed on the first stage (mixing 20 ml of 15% wt. $SiO_2$ colloidal solution with 3 ml of 2 mg/ml PEI solution, 15 min of incubation). Washing of the resulting composite nanoparticles was performed after each adsorption step by distilled water. Then, the adsorption of the second negative layer was carried out from 2 mg/ml PSS solution in 0.5 M NaCl. Benzotriazole is slightly soluble in water at neutral pH, since the adsorption of the third, inhibitor layer was accomplished from acidic media at pH=3, 10 mg/ml solution. PSS/benzotriazole adsorption was repeated to increase the inhibitor loading in the LbL structure. The final nanoreservoirs had a $SiO_2$/PEI/PSS/benzotriazole/PSS/benzotriazole layer structure (FIG. 1). Taking into account the amount of inhibitor remained in supernatant solutions after two adsorption steps, benzotriazole content in resulting $SiO_2$-based nanoreservoirs is estimated of about 95 mg per 1 g of $SiO_2$ nanoparticles.

Figure 2:
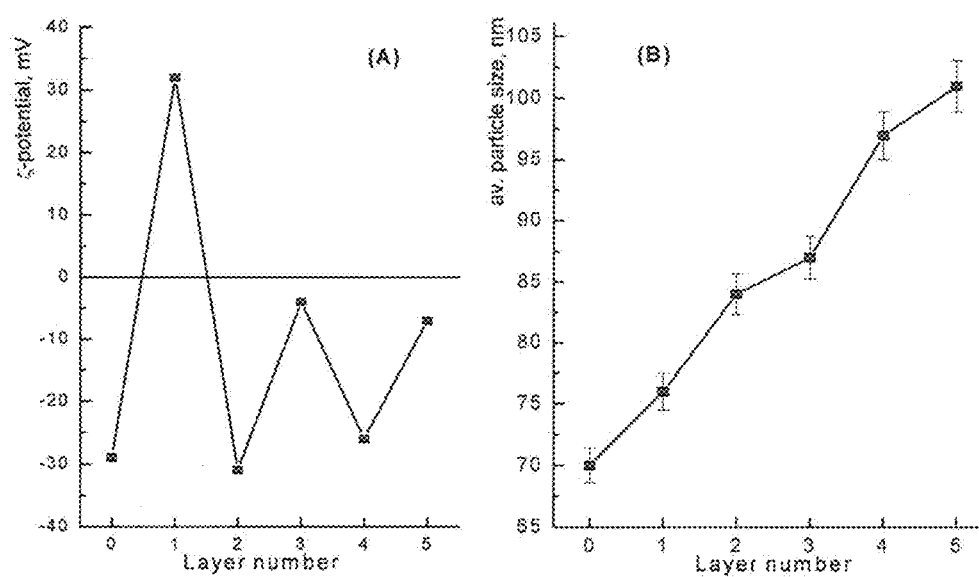
FIG. 2. (a)—electrophoretic mobility measurements of nanoreservoirs in water during LbL assembly: 0 layer number—initial $SiO_2$, 1 layer number—$SiO_2$/PEI, 2 layer number—$SiO_2$/PEI/PSS, 3 layer number—$SiO_2$/PEI/PSS/benzotriazole, 4 layer number—$SiO_2$/PEI/PSS/benzotriazole/PSS, 5 layer number—$SiO_2$/PEI/PSS/benzotriazole/PSS/benzotriazole. (b)—growth of the particle size during nanoreservoir assembly.

The $\zeta$-potential of the initial $SiO_2$ nanoparticles is negative (FIG. 2a). Electrophoretic measurements indicate the charging of the nanoparticles coated with the adsorbed polyelectrolyte or inhibitor layer upon each added layer. FIG. 2a shows a drastic increase of the surface charge after deposition of the first PEI layer (+65 mV) followed by similar (−68 mV) decrease after PSS adsorption on the next stage. Benzotriazole deposition leads to the more positive $\zeta$-potential (−5 mV) without complete recharging of the surface. The difference between the $\zeta$-potential of nanoparticles with PSS or benzotriazole outermost layers further decreases depositing a second PSS/benzotriazole bilayer. This is caused by different molecular weight and size of layer components. Large multicharged chains of PEI or PSS have stronger electrostatic forces and can be adsorbed in quantities sufficient to recharge the surface while small molecules of monocharged benzotriazole only compensate the excess of negative charge forming PSS/benzotriazole complex insoluble in slightly acidic media.

Figure 3:
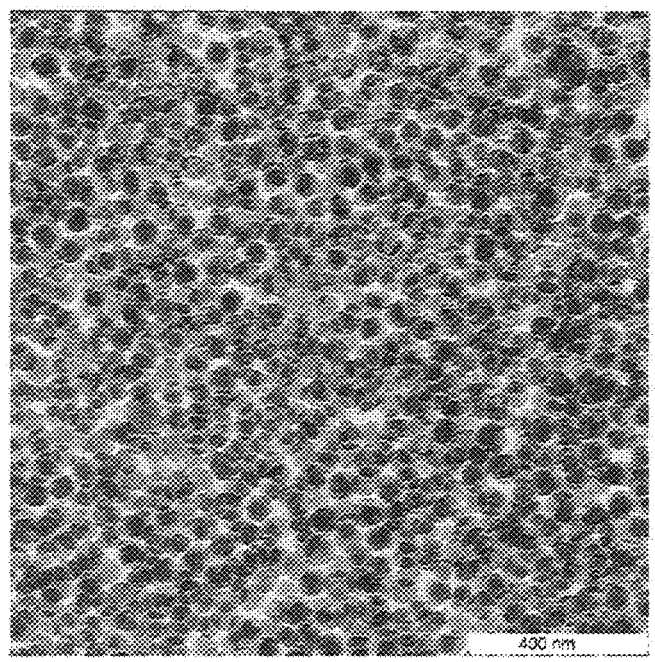
FIG. 3. TEM image of the final $SiO_2$/PEI/PSS/benzotriazole/PSS/benzotriazole nanoreservoirs in water suspension.

As seen in FIG. 2b, the average diameter of the nanoreservoirs obtained from the light scattering measurements increases with the layer number. For the first PEI and PSS monolayers the increment is about 8 nm per layer. Benzotriazole layers increase the size of nanoreservoirs by a smaller ~4 nm step confirming electrophoretic mobility data on lower adsorption efficiency of benzotriazole as compared to the polyelectrolytes. Growth of the nanoreservoir average diameter unambiguously proves LbL assembly of the polyelectrolytes and the inhibitor on the surface of $SiO_2$ nanoparticle. A transmission microscopy image of the resulting $SiO_2$/PEI/PSS/benzotriazole/PSS/benzotriazole nanoreservoirs is shown in FIG. 3. (For transmission electron microscopy a Zeiss EM 912 Omega instrument was used. Coated copper grids were employed to support the samples). The size and electrophoretic mobility measurements were performed using a Malvern Zetasizer 4 instrument. Nanoreservoirs are separate individual particles of ~100 nm diameter. The optimal number of the PSS/benzotriazole bilayers deposited onto silica nanoparticles is two. One bilayer is not sufficient to demonstrate the self-healing effect of the protective coating while three or more bilayers drastically increase aggregation of nanoreservoirs, which negatively affects the integrity of the protective coating and inhibitor distribution.

In the final step, the suspension of benzotriazole-loaded nanoreservoirs was mixed with $ZrO_2$ and organosiloxane sols following the sol-gel protocol set out below and deposited onto aluminium alloy AA2024 by a dip-coating procedure. FIG. 1 presents the surface topography of the hybrid sol-gel film with inhibitor nanoreservoirs. The morphology of the sol-gel films containing benzotriazole-loaded nanoreservoirs was assessed by atomic force microscopy (Nanoscope Digital Instruments) equipped with a NanoScope III controller.

The uniformly distributed nanoparticles are impregnated into the sol-gel film deposited on aluminium substrate. These particles in sol-gel matrix have a diameter about 100 nm. AFM does not show any signs of nanoreservoirs' agglomeration confirming the high stability of the reservoir suspension used to dope the hybrid sol-gel film. The thickness of the film measured by SEM is about 1600-2000 nm.

Preparation of sol-gel film: Hybrid films doped with benzotriazole-loaded nanoreservoirs were prepared using the controllable sol-gel route mixing two different sols. First sol was synthesized hydrolysing 70% wt. TPOZ precursor in n-propanol mixed with ethylacetoacetate (1:1 volume ratio). The mixture was stirred under ultrasonic agitation at room temperature for 20 minutes to obtain complexation of precursor. Then, the water based suspension of benzotriazole-loaded nanoreservoirs or acidified water in 1:3 molar ratio ($Zr:H_2O$) was added to the mixture drop by drop and agitated for 1 hour. The second organosiloxane sol was prepared hydrolyzing 3-glycidoxypropyltrimethoxysilane (GPTMS) in 2-propanol by addition of acidified water in a 1:3:2 (GPTMS:2-propanol:water) molar ratio. The zirconia-based sol was mixed with organosiloxane one in 1:2 volume ratio. The final sol-gel mixture was stirred under ultrasonic agitation for 60 min and then aged for 1 hour at room temperature. The sol-gel system is homogenous and transparent with light-yellow color and stable with time as shown by viscosity measurements (data not shown).

The aluminium alloy AA2024 was pre-treated in an alkaline aqueous solution containing 60 g/l of TURCO™ 4215 for 15 min at 60° C. followed by the immersion for 15 min in 20% nitric acid. Such treatment is industrially used for AA2024 and leads to partial dissolution of intermetallic particles. The sol-gel films were produced by a dip-coating procedure soaking the pre-treated substrate in the final sol-gel mixture for 100 seconds followed by controlled withdrawal with a speed of 18 cm/min. After coating, the samples were cured at 130° C. for 1 hour.

Three reference coatings were prepared to obtain a comparative estimation of corrosion protection performance of hybrid film doped with nanoreservoirs. One coating was prepared as described above without introduction of nanoreservoirs to the TPOZ solution. Two others were synthesized adding two different quantities of free, non-entrapped benzotriazole directly to the TPOZ solution (final concentration of benzotriazole was 0.13 and 0.63 wt. %).

Materials: Sodium poly(styrene sulfonate) (PSS, MW ~70000), poly(ethylene imine) (PEI, MW ~2000), benzotriazole, HCl, NaCl, zirconium n-propoxide (TPOZ), 3-glycidoxypropyl trimethoxysilane (GPTMS), propanol, ethylacetoacetate, $HNO_3$ were obtained from Aldrich. LUDOX® HS colloidal silica (40% suspension in water) (DuPont, France) was used as a source of silica nanoparticles. The aluminium alloy AA2024 was used as a model metal substrate. Before corrosion experiments the surface of the aluminium alloy was pre-treated with alkaline cleaner TURCO™ 4215 (from TURCO S.A., Spain) containing: sodium tetraborate and sodium tripolyphosphate mixed with a combination of surfactants. The water used in all experiments was prepared in a three-stage Millipore Milli-Q Plus 185 purification system and had a resistivity higher than 18 MΩ·cm.

Example 2

Electrochemical impedance measurements, which can provide a numerical evaluation of the physicochemical processes on the coated substrate during corrosion tests, were taken to estimate corrosion protection performance of the hybrid sol-gel films. For electrochemical impedance spectroscopy a three-electrode arrangement in a Faraday cage was used consisting of a saturated calomel reference electrode, a platinum foil as counter electrode and the exposed sample (3.4 $cm^2$) as a working electrode. The impedance measurements were performed on a Gamry FAS2 Femtostat with a PCI4 Controller at open circuit potential with applied 10 mV sinusoidal perturbations in 100 kHz-10 mHz frequency range with 10 steps per decade. The impedance plots were fitted with compatible equivalent circuit to simulate the state of aluminium alloy electrode during corrosion process.

Figure 4:
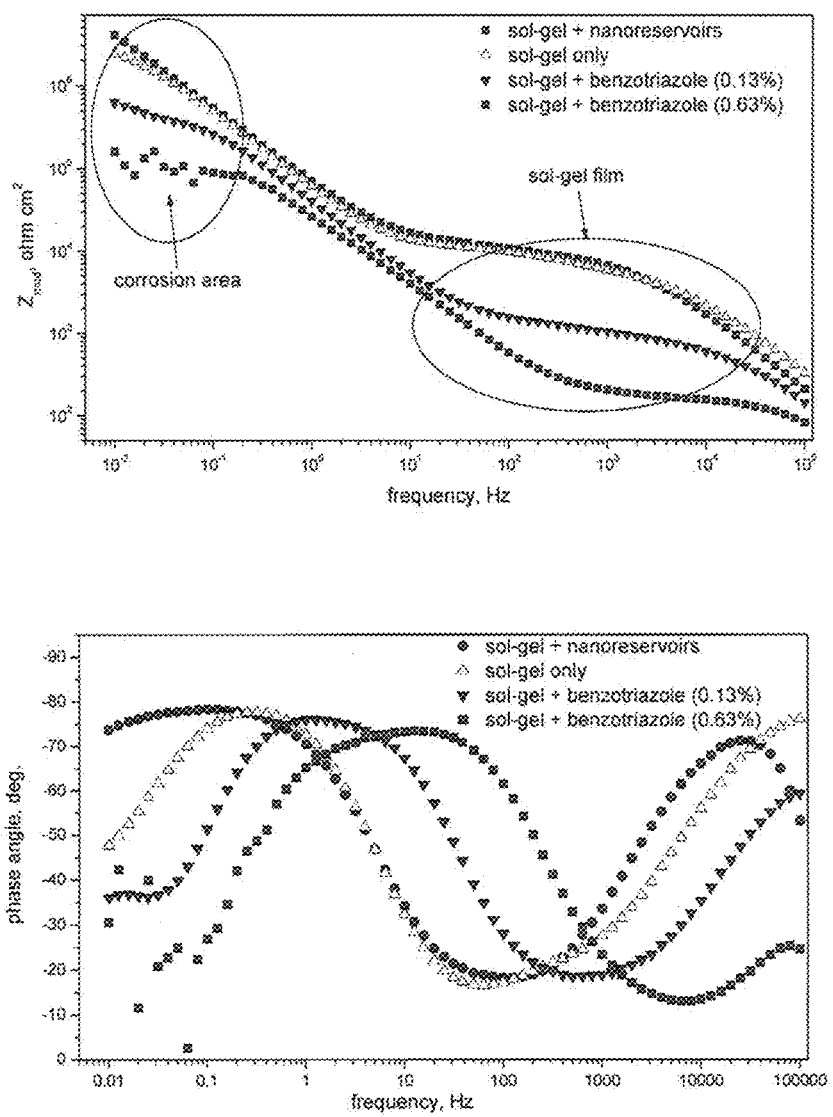
FIG. 4. Bode plots of AA2024 aluminum alloy coated with different sol-gel films after 48 hours of immersion in 0.005 M NaCl solution.

A low concentration of the chloride ions was used to decrease the rate of corrosion processes since the sol-gel film is not a complete coating and is used only as a pre-treatment. The decreased rate of the corrosion allows more correct estimation of the processes on the early stages. Behavior of developed composite films in 0.5 M and 0.005 M electrolytes is quite similar. However, as shown below, such concentration of chlorides is perfectly enough to cause drastic corrosion impact to the untreated AA2024-T3 substrate. FIG. 4 demonstrates typical Bode plots of aluminium alloy coated with different hybrid films ($ZrO_2/SiO_2$ film doped with nanoreservoirs, undoped $ZrO_2/SiO_2$ film, $ZrO_2/SiO_2$ films containing free inhibitor in the film matrix). The impedance spectra were obtained after 48 hours of immersion in sodium chloride solution. The ascription of the components of impedance spectra to specific processes is a very complicated issue and can not be done without support by other localized techniques especially when such complex systems are used. Therefore, a model proved elsewhere (H. Schmidt, S. Langenfeld, R. Naβ, *Mater. Des.* 1997, 18, 309, and M. L. Zheludkevich, R. Serra, M. F. Montemor, K. A. Yasakau, I. M. Miranda Salvado, M. G. S. Ferreira, *Electrochim. Acta* 2005, 51, 208) was used for impedance spectra interpretation. First high frequency maximum observed at $10^4$-$10^5$ Hz is characteristic for the capacitance of the sol-gel film. Another time-dependent process appears at medium frequencies between 0.1 and 10 Hz depending on the hybrid film. This time constant can be clearly ascribed to the capacitance of the intermediate oxide film formed by both the native $Al_2O_3$ layer and chemical Al—O—Si bonds. The first well-defined signs of a third relaxation process appear on the impedance spectra at low frequencies at about 0.01 Hz for sol-gel films with benzotriazole directly introduced into the hybrid matrix (benzotriazole concentration 0.13 and 0.63 wt. %). This low-frequency time constant appears due to the corrosion processes started on the surface of coated substrate. No signs of corrosion were found in the impedance spectra for undoped hybrid film and film loaded with nanoreservoirs indicating an effective barrier against corrosive species. The active corrosion processes on alloy surface protected by sol-gel films with directly introduced benzotriazole indicate the absence of any inhibition effect despite the fact that the free benzotriazole added to an aqueous solution is known as a very effective inhibitor of the corrosion processes on AA2024 aluminium alloy.

The resistive plateau at $10^2$-$10^4$ Hz represents pore resistance of the hybrid sol-gel coating (FIG. 4). The resistance of undoped sol-gel coating and that of film containing nanoreservoirs show high values of about $10^4$ ohm·$cm^2$. On the contrary, the coatings with benzotriazole directly introduced into sol-gel matrix exhibits sufficiently lower resistances (one order and two orders of magnitude in the case of 0.13% and 0.63% of benzotriazole, respectively). This decrease of sol-gel film resistance with increase of free benzotriazole concentration evidently indicates a strong adverse effect of the inhibitor on the weathering stability of the sol-gel matrix.

Figure 5:
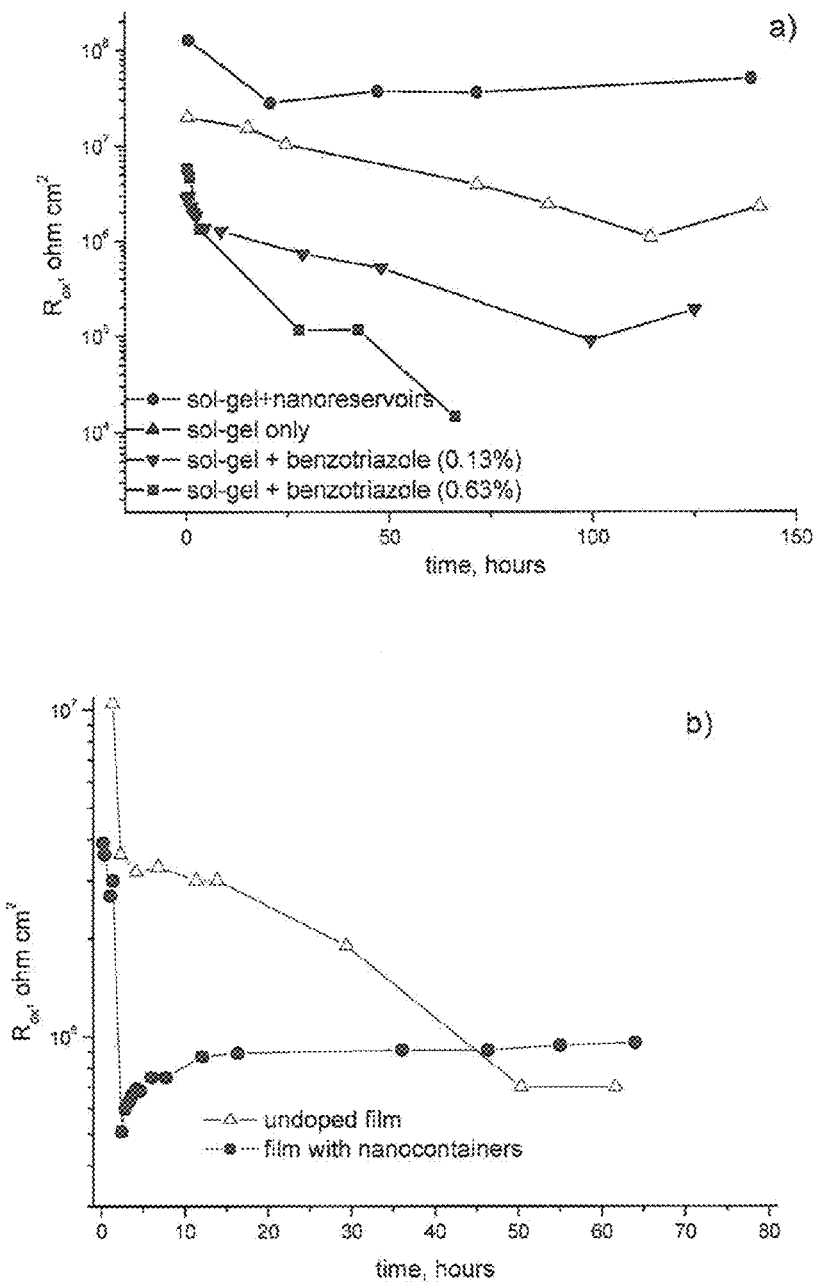
FIG. 5. a) Evolution of oxide layer resistance of sol-gel coated alloy with immersion time in 0.005M NaCl; b) Evolution of oxide film resistance in the 0.05 M NaCl. The defects were formed after immersion of samples in the 0.005 M NaCl for 14 days in the case of film impregnated with reservoirs and for 1 day in the case of the undoped hybrid film.

Another resistive part was observed at low frequencies ($10^{-1}$-$10^{-3}$ Hz) in all spectra except the one doped with nanoreservoirs (FIG. 4). This part of the impedance spectrum characterizes pore resistance of the $Al_2O_3$ oxide layer. After two days of immersion, the aluminium sample coated the by sol-gel film with nanoreservoirs still shows pure capacitative behavior confirming the intactness of the protective film. However, samples with other coatings reveal mixed capacitative/resistive behavior at low frequencies because of corrosion defects appearing in the $Al_2O_3$ oxide layer. Time-dependent evolution of the $Al_2O_3$ oxide layer resistance, which was derived from impedance measurements, for sol-gel film doped with nanoreservoirs demonstrates the highest value when compared to the other systems under study (FIG. 5a). This resistance slightly decreases at the beginning of corrosion tests and then maintains a constant value showing the very high corrosion protection. The sample coated with undoped sol-gel film has a low-frequency resistance one order of magnitude lower than that of the sample containing nanoreservoirs. The hybrid films with benzotriazole directly impregnated into the sol-gel matrix confer the sufficiently lower corrosion protection and show fast degradation of the intermediate oxide layer especially at the higher content of the inhibitor in the sol-gel matrix.

The fast degradation of barrier properties observed for the benzotriazole-impregnated hybrid film can be explained in terms of the strong influence of benzotriazole on the hydrolysis/polymerization processes during coating preparation. The capacitance of the undoped sol-gel film increases about one order of magnitude during 20 hours and then shows stable behavior. In contrast, the sol-gel film containing 0.13% of benzotriazole shows four orders of magnitude increase in capacitance. Such a high change of the capacitance cannot be explained only by water uptake and evidently indicates hydrolytic destruction of the sol-gel matrix, which leads to the change of dielectric properties of the hybrid film. This fact confirms once again the strong negative effect of free benzotriazole on the barrier properties of the sol-gel coating.

Example 3

An additional experiment was performed to provide evidence of the self-healing effect of nanoreservoirs added to the coating. The artificial defects were formed by a microneedle (5 defects of 50 μm size each per sample) in the sol-gel film after immersion in 0.005 M NaCl to provide direct ingress of corrosive medium to the alloy surface. The impedance spectra immediately after beginning the immersion of the defected samples show decrease of impedance and scattering of data at low frequencies originated from active processes in damaged zone. In the case of undoped sol-gel film formation of defects leads to scattering of data during long period therefore the defects were formed in this film after only 1 day in 0.005 M electrolyte. The composite film was artificially defected after 14 days of immersion. The resistance of the intermediate oxide layer was calculated from low-frequency part of the impedance spectra. FIG. 5b demonstrates evolution of the oxide film resistance in 0.05 M NaCl after defects formation. Initial resistance of the undoped coating is higher due to shorter immersion period before defect formation. The fast decrease of oxide resistance occurs immediately when the defects are induced. Following progressive drop of resistance demonstrate degradation of the corrosion protective performance. The resistance of oxide also decreases immediately after defects formation in hybrid film impregnated with nanoreservoirs. However after initial drop of impedance a very important recovery of oxide film resistance occurs during further 60 hours of immersion. The increase of resistance clearly indicates self-healing of defects in the nanoreservoirs-doped sol-gel coating. Such self-healing action was not revealed in the case of the AA2024 coated with undoped sol-gel film. Hence, self-healing effect can be ultimately originated from benzotriazole released from nanocontainers in the damaged area.

Example 4

Figure 6:
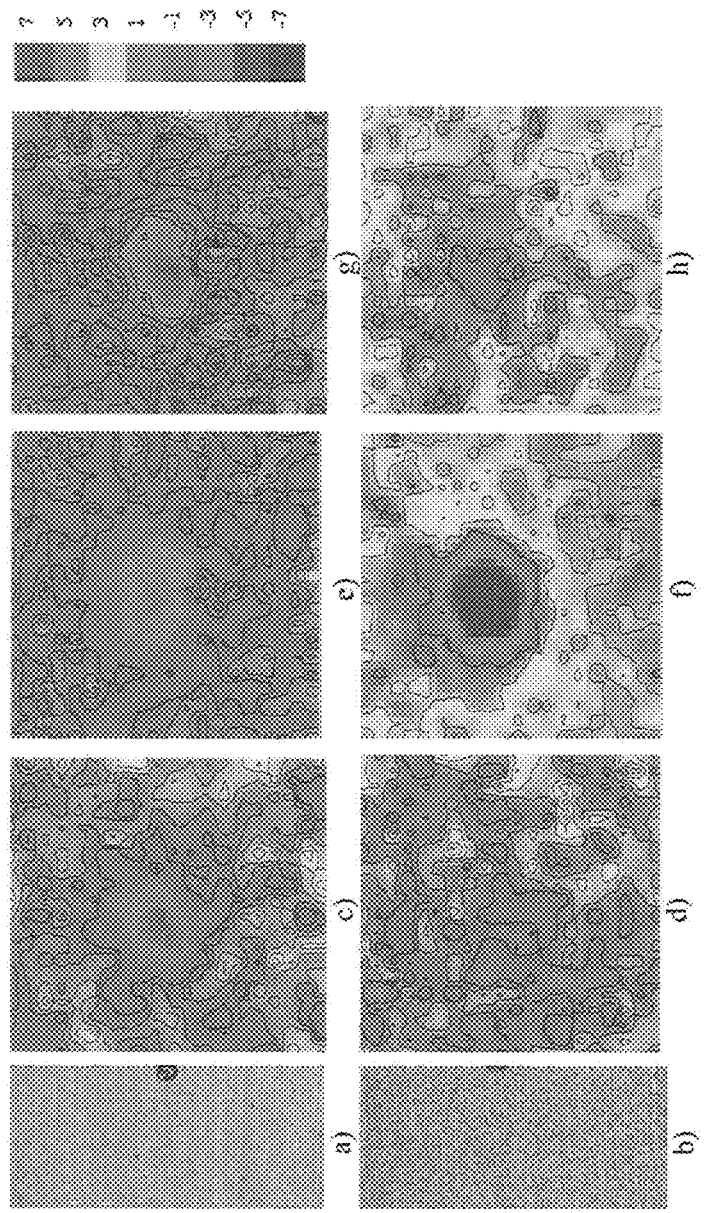
FIG. 6. SVET maps of the ionic currents measured above the surface of the defected (a, b) AA2024 coated with undoped sol-gel pre-treatment (c,e,g) and with that impregnated by nanoreservoirs (d,f,h). The maps were obtained in 5 h (c,d), 24 h (e,f) and 48 h (g,h) after defects formation. Scale units: $\mu A\ cm^{-2}$. Scanned area: 2 mm×2 mm.

Scanning vibrating electrode techniques (SVET) using an Applicable Electronics apparatus were employed to prove the self-healing ability of nanocomposite pre-treatments. This method can show the localized corrosion activity mapping the distribution of cathodic and anodic currents along the surface. The defects about 200 micron in diameter were formed on sol-gel pre-treated AA2024 surface as shown in FIG. 6a,b. The high cathodic current density appears immediately at the origin of defect when the undoped coating is immersed in 0.05 M NaCl showing well-defined corrosion activity. The defects remains active during all test (FIG. 6c,e,g). The sample coated with hybrid film doped with nanocontainers behaves completely different. During first 10 hours there are no remarkable currents at all in the defect zone (FIG. 6d). Only after about 24 hours the cathodic current appears. However 2 hours after the started activity the effective suppression of corrosion takes places decreasing the local current density. Cathodic activity in the location of defects becomes almost not visible again after 48 hours of continuous immersion (FIG. 6h). This effective suppression of the corrosion activity at relatively large artificial defect formed in the coating systems clearly prove the self-healing ability of hybrid pre-treatments doped with nanocontainers.

The aluminum alloy AA2024 used as a model substrate contains $Al_2CuMg$ intermetallics which are the first target of the corrosion attack. Corrosive medium contacts the intermetallic surface after penetrating the $Al_2O_3$ barrier layer causing the chemical reaction of aluminum and magnesium with water:

$$2Al+6H_2O \rightarrow 2Al^{3+}+6OH^-3H_2\uparrow,$$

$$Mg+2H_2O \rightarrow Mg^{2+}+2OH^-+H_2\uparrow.$$

Also the electrochemical evolution of hydrogen is possible on these intermetallic particles due to their cathodic potential in respect to the surrounding alloy matrix:

$$2H_2O+2e^- \rightarrow 2OH^-+H_2\uparrow.$$

Water oxidation of the aluminum alloy is accompanied by oxygen reduction which occurs according to the following equation:

$$O_2+2H_2O+4e^- \rightarrow 4OH^-.$$

Simultaneously the oxidation of magnesium and aluminium occurs at the anodic zones of the corrosion defect:

$$Al \rightarrow Al^{3+}+3e^-,$$

$$Mg \rightarrow Mg^{2+}+2e^-.$$

As one can see, both the hydrogen evolution and the oxygen reduction processes lead to the local increase of the pH value at micron-scale defect. Nanoreservoirs can be also found in this micron-scale area because they have homogeneous and dense-packed distribution in the hybrid sol-gel film (approximately 40-50 nanoreservoirs per 1 μm² of the film as seen from the AFM image in FIG. 1). Increase of the pH value in the surrounding media of the nanoreservoirs leads to the distortion of the polyelectrolyte layer structure and decomposition of PSS/benzotriazole complex, provoking the release of benzotriazole from nanocontainers around the formed defect. Released benzotriazole forms a thin adsorption layer on the damaged metallic surface sufficiently hindering anodic and cathodic corrosion processes and passivates the alloy by replacing the damaged $Al_2O_3$ film. Thus, the LbL assembled nanoreservoirs incorporated into the hybrid matrix release the inhibitor on demand healing the defects in the coating and providing an active corrosion protection with direct feedback.

Example 5

150 nm $ZrO_2$ particles coated with poly(allyl amine)/poly (acrylic acid) (PAH/PAA) layers were employed as nanoreservoirs. The corrosion inhibitor quinolinol was entrapped within polyelectrolyte multilayers at the LbL assembly step; its release can be initiated by pH changes during corrosion of steel alloy.

$ZrO_2$ nanoparticles were chosen as supporting hosts for the quinolinol due to their ability to be incorporated inside hybrid silica/zirconia matrix preserving its structure. Initial $ZrO_2$ nanoparticles are negatively charged, so the adsorption of positive PAH was performed from 2 mg/ml PAH solution in 0.5 M NaCl on the first stage. Washing of the resulting composite nanoparticles was performed after each adsorption step by distilled water. Then, the adsorption of the second negative PAA layer was carried out from 2 mg/ml PAA solution in 0.5 M NaCl. The adsorption of the third, inhibitor layer was accomplished from neutral media. PAA/quinolinol adsorption was repeated to increase the inhibitor loading in the LbL structure. The final nanoreservoirs had a $SiO_2$/PAH/PAA/quinolinol/PAA/quinolinol layer structure.

In the final step, the suspension of quinolinol-loaded nanoreservoirs was mixed with $ZrO_2$/$SiO_2$ sol following the sol-gel protocol and deposited onto steel by a dip-coating procedure.

Scanning vibrating electrode technique was applied to provide evidence of the self-healing effect of nanoreservoirs added to the coating. The artificial defects were formed by a microneedle (5 defects of 50 μm size each per sample) in the sol-gel film after immersion in 0.005 M NaCl to provide direct ingress of corrosive medium to the steel surface. The composite film was artificially defected after 14 days of immersion. Initial resistance of the undoped coating is higher due to shorter immersion period before defect formation. The resistance of oxide film decreases immediately after defects formation in hybrid film impregnated with nanoreservoirs. However after initial drop of impedance a very important recovery of oxide film resistance occurs during further days of immersion. The increase of resistance clearly indicates self-healing of defects in the nanoreservoirs-doped sol-gel coating. Such self-healing action was not revealed in the case of the steel coated with undoped sol-gel film. Hence, self-healing effect can be ultimately originated from quinolinol released from nanocontainers in the damaged area.

Example 6

Naturally occurring hollow alumosilicates of 50-nm diameter (halloysites) were utilized as another type of nanoreservoirs. The corrosion inhibitor mercaptobenzotriazole was entrapped inside tubular cavity from 10 mg/ml ethanol solution under vacuum pumping. To completely fill the cavity with the inhibitor, entrapment procedure was repeated four times. Then, the outer surface of halloysite particles was coated with polyelectrolyte multilayers (the adsorption of positive PAH was performed from 2 mg/ml PAH solution in 0.5 M NaCl on the first stage. Washing of the resulting halloysites was performed after each adsorption step by distilled water. Then, the adsorption of the negative PAA layer was carried out from 2 mg/ml PAA solution in 0.5 M NaCl. PAA/PSS adsorption was repeated two times) to attain pH-regulated gradual release of the entrapped mercaptobenzotriazole.

In the final step, the suspension of mercaptobenzotriazole-loaded halloysites was mixed with $SiO_2CeO_2$ sol following the sol-gel protocol and deposited onto aluminium surface by a dip-coating procedure.

Scanning vibrating electrode technique was applied to provide evidence of the self-healing effect of the loaded halloysites added to the coating. The artificial defects were formed by a microneedle (the same procedure as in previous examples, 5 defects of 50 μm size each per sample) in the sol-gel film after immersion in 0.005 M NaCl to provide direct ingress of corrosive medium to the aluminium surface. The resistance of oxide decreases immediately after defects formation in hybrid film impregnated with nanoreservoirs. However after initial drop of impedance a very important recovery of oxide film resistance occurs during further days of immersion. The increase of resistance clearly indicates self-healing of defects in the halloysite-doped sol-gel coating. Such self-healing action was not revealed in the case of the aluminium coated with undoped sol-gel film. Hence, self-healing effect can be ultimately originated from mercaptobenzotriazole released from nanocontainers in the damaged area.

In conclusion, we demonstrated a new approach for the formation of "smart" self-healing anticorrosion coatings based on silica nanoparticles layer-by-layer coated with polyelectrolyte molecules acting as a nanoreservoir for corrosion inhibitors (benzotriazole) incorporated in the hybrid sol-gel protective coating. These nanoreservoirs increase long-term corrosion protection of the coated aluminum substrate and provide an effective storage and prolonged release of the inhibitor "on demand" to the damaged zones conferring an active corrosion protection with self-heating ability. The use of LbL polyelectrolyte layers in anticorrosion coatings opens a fresh opportunity to create easy-made, cost-effective "intelligent" corrosion protection systems with active feedback to the corrosion processes possessing the effective self-repairing of the corrosion defects.

The invention claimed is:

1. A corrosion inhibiting pigment comprising nanoscale reservoirs (nanoreservoirs) of corrosion inhibitor for active corrosion protection of metallic products and structures comprising an active constituent consists essentially of the corrosion inhibitor, wherein, the nanoreservoirs have average dimensions of 1-1000 nm and comprise a polymer or polyelectrolyte shell sensitive to a selected trigger and releases said inhibitor after action of said trigger, 2) each of the nanoreservoirs has an individual polymer or polyelectrolyte shell, 3) the nanoreservoirs are selected from the group consisting of hollow polyelectrolyte capsules, hollow polymer capsules, nanotubes, halloysites, and hollow or porous nanoparticles coated with the polymer or polyelectrolyte shell, 4) the corrosion inhibitor is incorporated exclusively in cavities or pores of said nanoreservoirs.

2. The pigment according to claim 1, wherein the trigger is a change of pH, ionic strength, temperature, water, mechanical stress, a magnetic or electromagnetic field.

3. The pigment according to claim 1, in which the inhibitor comprises at least one of an organic compound selected from the group consisting of an organic compound containing one or more amino groups, an azolederivative compound, an organic compound containing one or carboxyl groups or salts of carboxylic acids, and an organic compound containing one or more pyridinium or pyrazine groups.

4. The pigment according to claim 3, in which the inhibitor is benzotriazole, mercaptobenzotriazol, quinaldic acid or quinolinol.

5. The pigment according to claim 1, in which the inhibitor comprises one or more Schiff bases.

6. The pigment according to claim 1, in which the inhibitor comprises one or more anions selected from the group consisting of pyrophosphate ($P_2O_7^{2-}$), nitrite ($NO_2^-$), silicate ($SiO_4^{2-}$), molybdate ($MoO_4^{2-}$), borate ($BO_4^{3-}$), iodate ($IO_3^-$), permanganate ($MnO_4^-$), tungstate ($WO_4^{2-}$) and vanadate ($VO_3^-$).

7. The pigment according to claim 1, in which the inhibitor comprises cations of one or metals selected from the group comprising lanthanides, magnesium, calcium, titanium, zirconium, yttrium, chromium and silver.

8. The pigment according to claim 3, in which the inhibitor comprises two or more of the organic compounds.

9. The pigment according to claim 1, in which the nanoreservoirs comprise a nanoscale solid substrate coated with a polymer or polyelectrolyte shell.

10. The pigment according to claim 1, in which the nanoreservoirs are nanoparticles of $SiO_2$, $ZrO_2$, $TiO_2$ or $CeO_2$.

11. The pigment according to claim 1, in which the polymer or polyelectrolyte shell comprises one or more layers of a polymer or polyelectrolyte selected from the group consisting of poly(alkylene imine), poly(styrene sulfonate), poly (allyl amine), polyvinyl alcohol, poly(hydroxybutyric acid), polystyrene, poly(diallyldimethylammonium chloride), poly (meth)acrylic acid, polyalkylene glycol, poly(vinylpyridine), and biopolymers and polyamino acids selected from the group consisting of gelatin, agarose, cellulose, alginic acid, dextran, casein, polyarginine, polyglycin, polyglutamic acid, polyaspartic acid, and derivatives, copolymers, and blends thereof.

12. The pigment according to claim 11, in which the polymer or polyelectrolyte shell comprises alternate layers of a positively charged polyelectrolyte, and of a negatively charged polyelectrolyte.

* * * * *